US006852771B2

(12) United States Patent
Balch et al.

(10) Patent No.: US 6,852,771 B2
(45) Date of Patent: Feb. 8, 2005

(54) DUAL RADIATION/THERMAL CURED COATING COMPOSITION

(75) Inventors: Thomas C. Balch, West Bloomfield, MI (US); Lyle A. Caillouette, Farmington, MI (US); Karl R. Gust, Troy, MI (US)

(73) Assignee: BASF Corporation, Southfield, MI (US)

( * ) Notice: Subject to any disclaimer, the term of this patent is extended or adjusted under 35 U.S.C. 154(b) by 93 days.

(21) Appl. No.: 10/454,056

(22) Filed: Jun. 4, 2003

(65) Prior Publication Data

US 2003/0207956 A1 Nov. 6, 2003

Related U.S. Application Data

(63) Continuation-in-part of application No. 09/940,748, filed on Aug. 28, 2001, now abandoned, and a continuation-in-part of application No. 09/941,118, filed on Aug. 28, 2001, now abandoned, and a continuation-in-part of application No. 09/941,283, filed on Aug. 28, 2001, and a continuation-in-part of application No. 09/941,295, filed on Aug. 28, 2001.

(51) Int. Cl.$^7$ .............................. C08J 3/28; C09D 5/03; C09D 167/00; C09D 171/00; C09D 175/14
(52) U.S. Cl. ..................... 522/135; 136/137; 136/139; 136/141; 136/142; 136/144; 136/145; 136/140; 427/508; 427/496; 522/91; 522/92; 522/93; 522/95; 522/96; 522/97
(58) Field of Search ................................. 427/496, 508; 522/91, 92, 93, 95, 96, 97, 98, 109–112, 100–103, 104–107, 134, 135, 136, 137, 139, 140, 141, 142, 143, 144, 145, 146, 147

(56) References Cited

U.S. PATENT DOCUMENTS

| 4,013,806 A | 3/1977 | Volkert et al. ................. 427/54 |
| 4,025,407 A | 5/1977 | Chang et al. .......... 204/159.14 |
| 4,128,600 A | 12/1978 | Skinner et al. .......... 260/859 R |
| 4,139,385 A | 2/1979 | Crivello ...................... 96/35.1 |
| 4,192,762 A | 3/1980 | Osborn ....................... 252/182 |
| 4,212,901 A | 7/1980 | Van Neerbos et al. ..... 427/53.1 |
| 4,247,578 A | 1/1981 | Skinner et al. ............... 427/44 |
| 4,268,542 A | 5/1981 | Sakakibara et al. ......... 427/195 |
| 4,287,116 A | 9/1981 | Burns ....................... 260/37 N |
| 4,342,793 A | 8/1982 | Skinner et al. ............... 427/44 |

(List continued on next page.)

FOREIGN PATENT DOCUMENTS

| CA | 2 073 115 | 7/1992 | ........... C08L/75/14 |
| CA | 2 079 498 | 9/1992 | ............ B05D/3/06 |
| CA | 2 153 581 | 1/1994 | ........... C08G/18/67 |
| DE | 38 28 098 | 3/1990 | ........... C08G/77/58 |
| DE | 40 11 045 | 10/1991 | ............ B05D/7/02 |
| DE | 40 20 316 | 1/1992 | ......... C09D/183/04 |
| DE | 40 25 215 | 2/1992 | ........... C08G/59/50 |
| DE | 43 02 327 | 8/1994 | ........... C08G/18/67 |
| DE | 198 26 715 | 1/1999 | ........... C07C/69/54 |
| DE | 19920799 | 11/2000 | ......... C09D/175/00 |
| DE | 199 20 801 | 11/2000 | ............ B05D/7/24 |
| DE | 19924674 | 11/2000 | ........... C09D/5/00 |
| DE | 19930067 | 1/2001 | ......... C09D/133/04 |
| DE | 19930664 | 1/2001 | ......... C09D/125/02 |
| DE | 19930665 | 1/2001 | ......... C09D/125/02 |
| DE | 10113884 | 10/2002 | ............ B05D/7/00 |
| EP | 0 298 611 | 6/1988 | ........... C08G/18/67 |
| EP | 0 401 892 | 5/1990 | ......... C09D/167/06 |
| EP | 0 594 068 | 10/1993 | ......... C09D/201/02 |
| EP | 0 594 071 | 10/1993 | ......... C09D/201/02 |
| EP | 0 594 142 | 10/1993 | ............ C08L/57/12 |
| EP | 0 753 358 | 7/1996 | ............ B05D/1/00 |
| EP | 0 844 286 | 12/1997 | ............ C09D/5/03 |
| EP | 0 872 502 | 3/1998 | ........... C08G/18/68 |
| EP | 0 940 459 | 2/1999 | ......... C09D/201/00 |
| GB | 1 583 412 | 8/1977 | ......... C08F/226/02 |
| WO | WO 94/10211 | 5/1994 | ............ C08F/8/30 |
| WO | WO 94/10212 | 5/1994 | ............ C08F/8/30 |
| WO | WO 94/10213 | 5/1994 | ............ C08F/8/30 |
| WO | WO 98/20047 | 5/1998 | ............ C08F/2/06 |
| WO | WO 02/34808 | 5/2002 | ........... C08G/18/67 |
| WO | WO 02/10292 | 7/2002 | ............ C09D/4/06 |

OTHER PUBLICATIONS

Aaron Lockhart, Bayer Polymers, Pittsburgh, PA, entitled "UV–Curable Waterborne Polyurethane Dispersions for Sealing Composite Automotive Body Panels", International Coatings for Plastics Symposium, Dated Jun. 9–11, 2003.
Translation of DE10113884.9, entitled "Coating Microporous Surfaces" Mar. 21, 2001, pp. 1–50 and the abstract.
English Abstract for DE3828098 from EPO, Mar. 4, 1990.
English Abstract for DE4011045 from EPO, Oct. 9, 1991.
English Abstract for DE4020316 from EPO, Jan. 9, 1992.
English Abstract for DE4025215 from EPO, Feb. 19, 1992.
English Abstract for JP06–286008 from EPO, Oct. 11, 1994.
English Abstract for EP0872502 from EPO, Oct. 21, 1998.

Primary Examiner—Susan Berman
(74) Attorney, Agent, or Firm—Michael Morgan

(57) ABSTRACT

Coating composition comprising (a1) radiation curable component that polymerizes upon exposure to actinic radiation comprising at least two functional groups comprising at least one bond that is activatable upon exposure to actinic radiation, optionally, at least one isocyanate-reactive functional group, and optionally, at least one hydroxyl-reactive functional group; (a2) thermally curable binder component that polymerizes upon exposure to heat comprising at least two functional groups that are reactive with functional groups of component (a3), wherein at least 5% by weight based on a nonvolatile weight of component (a2) is component (X) that is a polymer with at least two functional groups (a21), a Tg of less than 0° C., and an equivalent weight of greater than 225; (a3) thermally curable crosslinking component comprising at least two functional groups that are reactive with functional groups of (a2); and (a4) optionally, at least one reactive diluent.

31 Claims, No Drawings

U.S. PATENT DOCUMENTS

| | | | |
|---|---|---|---|
| 4,377,457 A | 3/1983 | Boeckeler et al. | 204/159.16 |
| 4,415,604 A | 11/1983 | Nativi | 427/54.1 |
| 4,424,252 A | 1/1984 | Nativi | 428/209 |
| 4,481,093 A | 11/1984 | Murphy et al. | 204/159.19 |
| 4,526,939 A | 7/1985 | Lewarchik et al. | 525/438 |
| 4,532,021 A | 7/1985 | Murphy et al. | 204/159.16 |
| 4,607,084 A | 8/1986 | Morris, deceased | 525/454 |
| 4,618,632 A | 10/1986 | Su | 522/43 |
| 4,634,602 A * | 1/1987 | Sirkoch et al. | 427/507 |
| 4,675,234 A | 6/1987 | Sachs et al. | 428/328 |
| 4,746,366 A | 5/1988 | Philipp et al. | 160/287.19 |
| 4,761,435 A | 8/1988 | Murphy et al. | 522/46 |
| 4,952,612 A | 8/1990 | Brown-Wensley et al. | 522/25 |
| 4,985,340 A | 1/1991 | Palazzotto et al. | 430/270 |
| 5,013,631 A | 5/1991 | Su | 430/271 |
| 5,089,376 A | 2/1992 | Setthachayanon | 430/284 |
| 5,153,101 A | 10/1992 | Meier et al. | 430/281 |
| 5,234,970 A | 8/1993 | Kyle | 522/96 |
| 5,326,621 A | 7/1994 | Palazzotto et al. | 428/195 |
| 5,356,669 A | 10/1994 | Rehfuss et al. | 427/407.1 |
| 5,384,358 A * | 1/1995 | Wamprecht et al. | 525/28 |
| 5,409,740 A | 4/1995 | Brann | 427/513 |
| 5,425,970 A * | 6/1995 | Lahrmann et al. | 427/493 |
| 5,453,451 A | 9/1995 | Sokol | 522/42 |
| 5,462,797 A | 10/1995 | Williams et al. | 428/345 |
| 5,474,811 A | 12/1995 | Rehfuss et al. | 427/407.1 |
| 5,580,614 A | 12/1996 | Amberg-Schwab et al. | 427/493 |
| 5,601,878 A | 2/1997 | Kranig et al. | 427/386 |
| 5,605,965 A | 2/1997 | Rehfuss et al. | 525/100 |
| 5,610,224 A | 3/1997 | DePue et al. | 524/538 |
| 5,626,958 A | 5/1997 | D'Herbecourt et al. | 428/327 |
| 5,691,419 A | 11/1997 | Engelke et al. | 525/208 |
| 5,716,678 A | 2/1998 | Röckrath et al. | 427/407.1 |
| 5,891,961 A * | 4/1999 | Kawamura et al. | 525/169 |
| 5,922,473 A | 7/1999 | Muthiah et al. | 428/481 |
| 5,965,213 A | 10/1999 | Sacharski et al. | 427/475 |
| 6,017,640 A | 1/2000 | Muthiah et al. | 428/514 |
| 6,159,556 A | 12/2000 | Möller et al. | 427/475 |
| 6,177,535 B1 | 1/2001 | Schwalm et al. | 528/49 |
| 6,242,101 B1 | 6/2001 | Schwalm et al. | 428/425.8 |
| 6,265,476 B1 | 7/2001 | Krongauz et al. | 524/262 |
| 6,332,291 B1 | 12/2001 | Flosbach et al. | 52/91 |
| 6,333,077 B1 | 12/2001 | Maag et al. | 427/496 |
| 6,335,397 B1 | 1/2002 | Kokel et al. | 524/507 |
| 6,344,501 B1 | 2/2002 | Sierakowski et al. | 523/410 |
| 6,436,477 B2 | 8/2002 | Laginess et al. | 427/372.2 |
| 6,476,121 B1 | 11/2002 | Kadambande et al. | 524/560 |
| 6,482,869 B1 | 11/2002 | Bolte et al. | 522/35 |
| 6,534,187 B2 | 3/2003 | Kron et al. | 428/447 |
| 2003/0023017 A1 | 1/2003 | Rink et al. | 526/301 |
| 2003/0077394 A1 | 4/2003 | Bradford et al. | 427/407.1 |
| 2003/0078315 A1 | 4/2003 | Bradford et al. | 522/126 |
| 2003/0078316 A1 | 4/2003 | Bradford et al. | 522/126 |
| 2003/0083397 A1 | 5/2003 | Bradford et al. | 522/173 |

* cited by examiner

US 6,852,771 B2

DUAL RADIATION/THERMAL CURED COATING COMPOSITION

CROSS-REFERENCE TO RELATED APPLICATIONS

The present application is a continuation in part of U.S. patent applications: Ser. No. 09/940,748, filed Aug. 28, 2001 now abandoned; Ser. No. 09/941,118, filed Aug. 28, 2001 now abandoned; Ser. No. 09/941,283, filed Aug. 28, 2001; and Ser. No. 09/941,295, filed Aug. 28, 2001, and all are incorporated herein by reference.

BACKGROUND OF THE INVENTION

Porous materials are used in a wide variety of applications. Porous as used herein refers to materials or substrates having one or more microporous surfaces with pore diameters of from 10 to 1500 nm. Examples of porous materials include wood, glass, leather, plastics, metals, mineral substances, fiber materials, and fiber reinforced materials.

Porous materials which are especially useful in the production of shaped and/or molded articles or components are plastics; mineral substances such as fired and unfired clay, ceramics, natural and artificial stone or cement; fiber materials especially glass fibers, ceramic fibers, carbon fibers, textile fibers, metal fibers, and composites thereof; fiber reinforced materials, especially plastic composites reinforced with one or more of the aforementioned fibers; and mixtures thereof. Examples of preferred porous materials for the production of shaped and/or molded articles are reaction injection molded compound (RIM), reinforced injection molded compound (RRIM), structural reinforced injection molded compound (SRIM), nylon composites, fiber reinforced sheet molded compounds (SMC) and fiber reinforced bulk molded compounds (BMC). SMC and BMC are most preferred porous substrates.

SMC and BMC have been found to be especially useful in the production of shaped articles having challenging contours and/or configurations. Compared to steel and thermoplastics, composites offer numerous advantages. They provide a favorable weight to strength ratio, consolidate multiple piece components, reduce tooling costs, provide improved dent and corrosion resistance, moderate process cycle times, reduce the cost of design changes, as well as moderate material cost. SMC and BMC have been used in the manufacture of domestic appliances, automotive components, structural components and the like.

In many instances, it is desirable to apply one or more coating compositions to the surface of the shaped porous article. Coatings may be designed to provide effects which are visual, protective, or both. However, the production of coated shaped porous articles, especially articles of SMC or BMC, continues to present challenges.

Many shaped articles made of SMC or BMC have one or more sections in which it is more difficult to obtain a fully cured film. For example, some shaped articles contain areas of greater thickness that can function as heat sinks. This can result in lower effective surface temperatures that impede the cure of thermally curable coatings applied in that area.

Efforts to use coatings curable solely with the use of actinic radiation have encountered other problems. Actinic radiation as used herein refers to electromagnetic radiation such as UV radiation or X-rays, as well as to corpuscular radiation such as electron beams. The unique contours and configurations of many shaped porous articles result in three-dimensional articles having 'shadow' zones or areas that are obscured from direct irradiance from the chosen energy source. Thus, the use of coatings cured via actinic energy sources can result in uncured or partially cured coating films in those shadow areas not visible to one or more of the energy sources. Alternatively, increased expense may be incurred due to the procurement of additional actinic energy sources in an effort to 'reach' all shadow areas. It will be appreciated that in many instances, manufacturing constraints will limit the number and/or location of actinic energy sources. Also, in many cases the overspray does not cure due to oxygen inhibition caused by the large surface area ratio of the particle and any dispersed oxygen within the particle.

Another significant problem encountered in the coating of porous substrates is the persistent appearance of surface defects, such as porosity, popping, or blistering. These defects significantly reduce first run capability, capacity and quality while increasing process and operational costs. Porosity is apparent after the primer and/or topcoating process. It may appear in the topcoat without any visible defects in the primer. It can be extremely sporadic and unpredictable. The defect can appear as a full dome or the residue from a deflated bubble. Unfortunately, the presence of even a few such porosity defects can result in the rejection of the coated article. Thus, manufacturers of coated porous surfaces have long sought methods capable of consistently producing high quantities of defect-free coated surfaces having optimum smoothness. Methods capable of substantially eliminating porosity defects are especially desired.

In addition, applied coatings must have good adhesion to the underlying porous substrate and be overcoatable with one or more subsequently applied coatings. The failure of an applied, cured film to either the underlying substrate and/or to one or more subsequently applied coatings is referred to herein as an intercoat adhesion (ICA) failure. Coatings vulnerable to adhesion failures are commercially unacceptable, especially to the automotive industry. Porous materials may be categorized as either flexible or rigid. Flexible materials are designed to have a relatively low Young's modulus so as to allow some degree of movement under application of a stress. All coating layers that are applied to such substrates must exhibit a similar degree of flexibility or there may be adhesion or cracking failures with application of stress (for example: a mandrel bend test). Rigid substrates, although not designed to be flexible, are often subjected to significant stresses during the manufacturing of the article. These may occur after the application of the coating of this invention but prior to application of the final topcoats. For example, this would include so called "closure panel" on automobiles, such as, door and hood panels. If the coating compositions used are not flexible, they may crack during the strains induced in the substrate. This may impair the ability of the coating to provide improvements in the topcoated porous surface that are substantially free of surface defects.

Adhesion can be particularly challenging when a coated plastic substrate becomes part of an article that is subsequently subjected to the electrocoat process. In some manufacturing facilities, it is desirable for coated porous shaped articles of SMC/BMC to be affixed to metal structure prior to their submersion in an e-coat bath. After exiting from the bath, the entire structure is subjected to conditions sufficient to effect complete crosslinking of the electrodeposition coating where present. Although the coated shaped article of SMC/BMC will generally not be coated during this process, it is desirable that the electrodeposition bake not affect the overcoatability of any coatings applied prior to the electrodeposition bake. In particular, any coatings applied to the substrate before the electrodeposition bake must continue to exhibit desirable adhesion with regards to subsequently applied primers, basecoats, and/or clearcoats.

In addition to optimum adhesion, coatings intended to correct porosity defects must also exhibit desirable weatherability, durability, humidity resistance, smoothness, and the like. In particular, coatings intended to eliminate surface defects must continue to exhibit optimum adhesion in thermal shock tests, cold gravel tests and after weathering tests such as Florida exposure, QUV, WOM or field use.

Although the prior art has attempted to address these issues, deficiencies remain.

German Patent Application DE 199 20 799 (U.S. Ser. No. 10/018,106, filed Oct. 30, 2001), which is incorporated herein by reference, provides a coating composition curable both thermally and with actinic radiation. The composition comprises at least one constituent (a1) containing at least two functional groups (a11) which serve for crosslinking with actinic radiation and if desired, at least two functional groups (a12), which are able to undergo thermal crosslinking reactions with a complementary functional group (a22) in component (a2). Examples of functional groups (a11) and (a12) are respectively acrylate groups and hydroxyl groups. The composition further comprises at least one component (a2) containing at least two functional groups (a21) which serve for crosslinking with actinic radiation, and at least one functional group (a22) which is able to undergo thermal crosslinking reactions with complementary functional group (a12) of constituent (a1). Examples of functional groups (a21) and (a22) are respectively acrylate groups and isocyanate groups.

The composition of DE 199 20 799 further comprises a at least one photoinitiator (a3), at least one thermal crosslinking initiator (a4), at least one reactive diluent (a5) curable thermally and/or with actinic radiation, at least one coatings additive (a6), and/or at least one thermally curable constituent (a7), with the proviso that the coating composition comprises at least one thermally curable constituent (a7) if constituent (a1) has no functional group (a12). Illustrative examples of materials suitable for use as constituent (a7) include thermally curable binders and/or crosslinking agents such as blocked polyisocyanates.

German patent applications DE 199 30 665 A1 (U.S. Ser. No. 10/018,351, filed Dec. 7, 2001), DE 199 30 067 A1 (U.S. Ser. No. 10/018,703, filed Dec. 13, 2001), DE 199 30 664 A1 (U.S. Ser. No. 10/018,352, filed Dec. 7, 2001) and DE 199 24 674 A1 (U.S. Ser. No. 09/926,532, filed Nov. 16, 2001), all of which are incorporated herein by reference, disclose coating materials curable thermally and with actinic radiation and comprising at least one constituent (a1), containing on average per molecule at least two functional groups (a11) which contain at least one bond which can be activated with actinic radiation and which serves for crosslinking with actinic radiation, and, if desired, at least one isocyanate-reactive group (a12), for example, a hydroxyl group, at least one thermally curable component (a2) containing at least two isocyanate-reactive groups, said constituent mandatorily comprising copolymers of olefinically unsaturated monomers with diphenylethylene and its derivatives, and (a3) at least one polyisocyanate.

International patent application WO 98/40170 (U.S. Pat. No. 6,333,077) discloses a wet-on-wet process in which an applied but uncured basecoat film is overcoated with a clearcoat. The applied but uncured clearcoat film is then exposed to actinic radiation before the two films are baked together. The clearcoat composition, based on solids, contains from 50 to 98% by weight of a system A) and from 2 to 50% of a system B. System A is thermally curable by addition and/or condensation reactions and is substantially free from free-radically polymerizable double bonds and from groups which are otherwise reactive with free-radically polymerizable double bonds of System B. System B is curable by exposure to actinic radiation through free-radical polymerization of olefinic double bonds. The system A) preferably comprises a hydroxy-functional acrylate binder having an unspecified glass transition temperature. System (B) may be a one-, two-, or multi-component system. The international patent application does not indicate whether the disclosed clearcoat composition addresses issues relating to the coating of microporous surfaces.

DE 101 13 884.9, which is incorporated herein by reference, discloses a process for the coating of microporous surfaces having pores of a size of from 10 to 1500 nm, especially SMC and BMC. The process utilizes a coating composition that comprises at least one constituent (a1), at least one thermally curable component (a2), and at least one polyisocyanate (a3). Constituent (a1) comprises at least two functional groups (a11) per molecule which have at least one bond activatable with actinic radiation and, optionally at least one isocyanate-reactive group (a12). Component (a2) comprises at least two isocyanate-reactive groups.

While the foregoing do provide improvements, none of the prior art compositions have been able to consistently provide all of the desired performance properties.

There is thus a continuing need for coating compositions and/or processes which can provide improvements in the coating of porous surfaces and the obtainment of topcoated porous surfaces that are substantially free of surface defects and which simultaneously possess a variety of other commercially desirable performance properties, especially commercially acceptable adhesion between coating layers.

SUMMARY OF THE INVENTION

The present invention relates to a coating composition comprising
- (a1) a radiation curable component that polymerizes upon exposure to actinic radiation comprising
  - (a11) at least two functional groups comprising at least one bond that is activatable upon exposure to actinic radiation,
  - (a12) optionally, at least one isocyanate-reactive functional group, and
  - (a13) optionally, at least one hydroxyl-reactive functional group;
- (a2) a thermally curable binder component that polymerizes upon exposure to heat comprising at least two functional groups (a21) that are reactive with functional groups of component (a3), wherein at least 5% up to 100% by weight based on a nonvolatile weight of component (a2) is a component (X) that is a polymer with at least two functional groups (a21), a glass transition temperature of less than 0° C., and an equivalent weight of greater than 225 grams per equivalent;
- (a3) a thermally curable crosslinking component comprising at least two functional groups that are reactive with the functional groups (a21); and
- (a4) optionally, at least one reactive diluent, wherein the coating composition is curable upon exposure to both actinic radiation and thermal energy.

DETAILED DESCRIPTION

As used throughout, ranges are used as a shorthand for describing each and every value that is within the range. Any value within the range can be selected as the terminus of the range.

The coating compositions of the invention are dual cure. As defined herein, 'dual cure' refers to curable coating compositions that require exposure to both actinic radiation and heat to achieve a degree of crosslinking to achieve desired performance properties. Thus, in one aspect, the coating compositions of the invention are at least partially curable or polymerizable upon exposure to some portions of the electromagnetic radiation spectrum. In another aspect of the invention, the coating compositions of the invention are at least partially thermally curable or polymerizable upon exposure to thermal or heat energy.

Radiation cure and thermal cure may occur sequentially or concurrently. In a preferred embodiment, the coating compositions of the invention will be subjected to a first stage of curing followed by a second stage of curing. Either radiation cure or thermal cure may occur first. In a most preferred embodiment, the coating compositions of the invention will first be subjected to actinic radiation, especially UV radiation, followed by a second stage of cure, wherein the coating compositions previously subjected to actinic radiation will be subjected to a thermal cure.

It is within the scope of the invention that the second stage does not have to immediately succeed the first stage and can occur after the application of one or more subsequently applied coatings. For example, it is within the scope of the invention to apply one or more additional coating compositions to the radiation cured coating of the invention and then simultaneously thermally cure the one or more additionally applied coatings together with the radiation cured coating of the invention.

Actinic radiation as used herein refers to energy having wavelengths of less than 500 nm and corpuscular radiation such as electron beam. Preferred actinic radiation will have wavelengths of from 180 to 450 nm, i.e., in the UV region. More preferably, the actinic radiation will be UV radiation having wavelengths of from 225 to 450 nm. The most preferred actinic radiation will be UV radiation having wavelengths of from 250 to 425 nm.

Heat as used herein refers to the transmission of energy by either contact via molecular vibrations or by certain types of radiation.

Heat energy transferred by radiation as used herein refers to the use of electromagnetic energy generally described as infrared (IR) or near-infrared (NIR), i.e., energy having an approximate wavelength of from 800 nm to $10^{-3}$ m.

Heat as used herein also encompasses energy transferred via convection or conduction. Convection refers to the transmission of heat by the rise of heated liquids or gases and the fall of colder parts. Conduction may be defined as the transmission of matter or energy. Transmission of heat energy via convection is especially preferred.

The coating compositions of the invention comprise at least three components, a radiation curable component (a1) that polymerizes upon exposure to actinic radiation, especially UV radiation, a thermally curable binder component (a2) that polymerizes upon exposure to heat, and a thermally curable crosslinking component (a3) that has at least 2 isocyanate groups per molecule.

Radiation curable component (a1) contains on average at least two functional groups (a11) per molecule, and more preferably at least three functional groups (a11). Each functional group (a11) will preferably have at least one bond that is activatable upon exposure to actinic radiation, especially UV radiation, so as to crosslink. In a particularly preferred embodiment, each functional group (a11) will have one UV activatable bond.

In a preferred embodiment, the coating composition of the invention will comprise not more than six functional groups (a11) on average per molecule, and most preferably not more than five functional groups (a11) on average per molecule.

Examples of suitable bonds that can be activated with actinic radiation, and especially UV radiation, are carbon-hydrogen single bonds, carbon-carbon single bonds, carbon-oxygen single bonds, carbon-nitrogen single bonds, carbon-phosphorus single bonds, carbon-silicon single bonds, carbon-carbon double bonds, carbon-oxygen double bonds, carbon-nitrogen double bonds, carbon-phosphorus double bonds, carbon-silicon double bonds, or carbon-carbon triple bonds. Of these, the double bonds are preferred, with the carbon-carbon double bonds being most preferred.

Highly suitable carbon-carbon double bonds are present, for example, in at least one of a (meth)acrylate group, an ethacrylate group, a crotonate group, a cinnamate group, a vinyl ether group, a vinyl ester group, an ethenylarylene group, a dicyclopentadienyl group, a norbornenyl group, a isoprenyl group, an isopropenyl group, an allyl group, a butenyl group, an ethenylarylene ether group, a dicyclopentadienyl ether group, a norbornenyl ether group, an isoprenyl ether group, an isopropenyl ether group, an allyl ether group, a butenyl ether group, an ethenylarylene ester group, a dicyclopentadienyl ester group, a norbornenyl ester group, an isoprenyl ester group, an isopropenyl ester group, an allyl ester group, and a butenyl ester group. Of these, (meth)acrylate groups are preferred, with acrylate groups being most preferred.

Radiation curable component (a1) may further comprise at least one functional group (a12) that is reactive with the isocyanate groups (a31) of thermally curable crosslinking component (a3).

Examples of suitable isocyanate-reactive groups are all those groups that are reactable with isocyanates. Examples of suitable functional groups include, but are not limited to, thiol groups, primary amino groups, secondary amino groups, imino groups, and hydroxyl groups, with hydroxyl groups being most preferred.

Radiation curable component (a1) may further comprise at least one functional group (a13) that is a hydroxyl-reactive functional group. Examples of suitable hydroxyl-reactive groups are all those groups that are reactable with hydroxyl groups. Examples of suitable functional groups include, but are not limited to, isocyanates, aminoplasts, epoxy groups, silane groups, cyclic anhydrides, and cyclic lactones.

Radiation curable component (a1) may be oligomeric or polymeric. In the context of the present invention, an oligomer is a compound containing in general on average from 2 to 15 basic structures or monomer units. A polymer, in contrast, is a compound containing in general on average at least 10 basic structures or monomer units. Such compounds may also be referred to as binders or resins. In contrast, a low molecular mass compound in the context of the present invention refers to a compound that derives substantially from only one basic structure or monomer unit. Compounds of this kind may also be referred to as reactive diluents and are discussed below in regards to optional reactive diluent component (a4).

Radiation curable component (a1) will generally have a number average molecular weight of from 500 to 50,000, preferably from 1000 to 5000. In a preferred aspect of the invention, the sum of radiation curable component (a1) and any optional reactive diluents (a4) will preferably have a double bond equivalent weight of from 400 to 2000, more preferably of from 500 to 900. In addition, the combination of radiation curable components (a1) and any optional reactive diluents (a4) will preferably have a viscosity at 23° C. of from 250 to 11,000 mPas.

Radiation curable component (a1) may be employed in an amount of from 1 to 50% by weight, preferably from 3 to 45% by weight, and most preferably from 5 to 20% by weight, based in each case on the total nonvolatile solids of the film-forming components of the coating composition of the invention. Film-forming components as used herein refers to components such as radiation curable component (a1), thermally curable binder component (a2), thermally curable crosslinking component (a3), optional reactive diluent (a4), and any other monomeric, oligomeric or polymeric components that chemically react with any of components (a1), (a2), or (a3) so as to enter into the resulting polymerized network.

Examples of binders or resins suitable for use as radiation curable component (a1) include, but are not limited to, the oligomer and/or polymer classes of the (meth)acryloyl-functional(meth)acrylic copolymers, polyether acrylates, polyester acrylates, polyesters, epoxy acrylates, urethane acrylates, amino acrylates, melamine acrylates, silicone acrylates and phosphazene acrylates, the corresponding (meth)acrylates, vinyl ethers, and vinyl esters. It will be appreciated that (meth)acrylics and (meth)acrylates refer to both acrylates and methacrylates as well as acrylics and methacrylics. However, acrylic and acrylate species are preferred over methacrylic and methacrylate species.

Radiation curable component (a1) will preferably be free from aromatic structural units. Preference is given to using urethane (meth)acrylates, phosphazene (meth) acrylates, and/or polyester (meth) acrylates, with urethane (meth) acrylates, with aliphatic urethane acrylates being most preferred.

Urethane (meth)acrylates suitable for use as radiation curable component (a1) may be obtained by reacting a diisocyanate or a polyisocyanate with a chain extender that is at least one of a diol, a polyol, a diamine, a polyamine, a dithiol, a polythiol, and an alkanolamine, and then reacting the remaining free isocyanate groups with at least one hydroxyalkyl (meth)acrylate or a hydroxyalkyl ester of one or more ethylenically unsaturated carboxylic acids. The amounts of chain extenders, diisocyanates and/or polyisocyanates, and hydroxyalkyl esters in this case are preferably chosen so that 1) the ratio of equivalents of the NCO groups to the reactive groups of the chain extender (hydroxyl, amino and/or mercaptyl groups) is between 3:1 and 1:2, and most preferably 2:1, and 2) the OH groups of the hydroxyalkyl esters of the ethylenically unsaturated carboxylic acids are stoichiometric with regard to the remaining free isocyanate groups of the prepolymer formed from isocyanate and chain extender.

It is also possible to prepare urethane (meth)acrylates suitable for use as radiation curable component (a1) by first reacting some of the isocyanate groups of a diisocyanate or polyisocyanate with at least one hydroxyalkyl ester and then reacting the remaining isocyanate groups with a chain extender. The amounts of chain extender, isocyanate, and hydroxyalkyl ester should also be selected such that the ratio of equivalents of the NCO groups to the reactive groups of the hydroxyalkyl ester is between 3:1 and 1:2, preferably 2:1, while the ratio of equivalents of the remaining NCO groups to the OH groups of the chain extender is 1:1.

It will be appreciated that urethane (meth)acrylates that result from other reaction mechanisms may also be suitable for use as radiation curable component (a1) in the instant invention. For example, some of the isocyanate groups of a diisocyanate may first be reacted with a diol, after that a further portion of the isocyanate groups may be reacted with a hydroxyalkyl ester, and subsequently reacting the remaining isocyanate groups with a diamine.

In another embodiment, urethane (meth)acrylates suitable for use as radiation curable component (a1) may be flexibilized. For example, a urethane (meth)acrylate may be flexibilized by reacting corresponding isocyanate functional prepolymers or oligomers with relatively long-chain aliphatic diols and/or diamines, especially aliphatic diols and/or diamines having at least 6 carbon atoms. Such flexibilizing reactions may be carried out before or after the addition of acrylic and/or methacrylic acid onto the oligomers and/or prepolymers.

Illustrative examples of urethane (meth)acrylates suitable for use as radiation curable component (a1) include polyfunctional aliphatic urethane acrylates that are commercially available in materials such as CRODAMER® UVU 300 from Croda Resins Ltd., Kent, Great Britain; GENOMER® 4302, 4235, 4297, or 4316 from Rahn Chemie, Switzerland; EBECRYL® 284, 294, IRR 351, 5129, or 1290 from UCB, Drogenbos, Belgium; ROSKYDAL® LS 2989 or LS 2545 or V94-504 from Bayer AG, Germany; VIAKTIN® VTE 6160 from Vianova, Austria; or LAROMER® 8861 from BASF AG and experimental products modified from it.

Hydroxyl-containing urethane (meth)acrylates suitable for use as radiation curable component (a1) are disclosed in U.S. Pat. No. 4,634,602 A and U.S. Pat. No. 4,424,252 A. An example of a suitable polyphosphazene (meth)acrylate is the phosphazene dimethacrylate from Idemitsu, Japan.

The coating material further comprises at least one thermally curable binder component (a2) comprising at least two isocyanate-reactive groups (a21). Examples of suitable isocyanate-reactive groups (a21) are those described above with respect to isocyanate-reactive groups (a12). Most preferably, the isocyanate reactive groups (a21) are hydroxyl groups.

At least 5% up to 100% of the binder component (a2) by solids weight of the binder component (a2) is a component (X). Component (X) is a polymer with at least two functional groups (a21), a glass transition temperature (Tg) of less than 0° C., and an equivalent weight of greater than 225 grams per equivalent. Preferably, the Tg of the homopolymer is less than −20° C., and most preferably less than −50° C. Preferably, the equivalent weight is greater than 265. Preferably, component (X) is at least one of a polyether diol, a polyether polyol, a polyester diol, and a polyester polyol. Preferably, the amount is from 20% to 40%.

Examples of the polyether diol include, but are not limited to, polyoxyalkylenes. Examples of the polyoxyalkylenes include, but are not limited to, polyethylene oxide, polypropylene oxide, and polytetrahydrofuran. Generally, there are at least 4 repeating units in the polyether diol. Preferably, there are from 7 to 50 repeating units.

Examples of the polyether polyol include, but are not limited to, the polyether polyols sold under the trademarks LUPRANOL®, PLURACOL®, PLURONIC®, and TETRONIC® from BASF; ARCOL®, DESMOPHEN®, and MULTRANOL® from Bayer; VORANOL® from Dow; CARPOL® from E. R. Carpenter; PORANOL™ from Hannam, Korea; and KONIX™ from Korea Polyol.

Examples of the polyester diol include, but are not limited to polylactones (such as poly ε-caprolactone) and polyesters derived from dimer fatty acid, isophathlic acid, and 1,6- hexanediol. Preferably, the polyester diol is a poly ε-caprolactone, which is available as TONE®201 or TONE®301. Generally, there are at least 4 repeating units in the polyester diol or triol. Preferably, there are from 4 to 50 repeating units. Examples of polyester diols can be found in U.S. Pat. No. 5,610,224, which is incorporated herein by reference.

The polyester polyols may be formed from lactone extension of higher functional polyols, which are polyols having more than 3 OH groups. An example of the polyester polyol is an ε-caprolactone extension of pentaerythritol. Generally there are at least one average 2 lactones per OH group on the polyol. Preferably, there are from 2 to 25 lactones per OH group on average. The polyester polyols can be prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids, and mixtures of these acids and/or acid anhydrides. Hydroxyl group-containing polylactones, especially poly-ε-caprolactones, are also suitable. Polyols suitable for the preparation of the polyester polyol include, but are not limited to, polyhydric alcohols such as ethylene glycol, propanediols, butanediols, hexanediols, neopentyl glycol, diethylene glycol, cyclohexanediol, cyclohexanedimethanol, trimethylpentanediol, ethylbutylpropanediol ditrimethylolpropane, trimethylolethane, trimethylolpropane, glycerol, pentaerythritol, dipentaerythritol, trishydroxyethyl isocyanate, polyethylene glycol, polypropylene glycol, and the like, as well as combinations of these. The polyol component may also include, if desired, minor amounts of monohydric alcohols, for example butanol, octanol, lauryl alcohol, and ethoxylated and propoxylated phenols. Lactones, especially ε-caprolactone, are also suitable for the preparation of the polyesters. Polylactone polyol can be used as a reactant in the polyester synthesis. In another embodiment, a polyester polyol can be modified by reaction with a lactone. Further examples of polyester diols can be found in U.S. Pat. Nos. 6,436,477 and 5,610,224, both of which are incorporated herein by reference.

By including at least 5% of at least one of the polyether diol, the polyester diol or triol, and the polyester polyol in the coating composition, the flexibility of a coating prepared from the coating composition will be greater than the flexibility of a coating prepared from a coating composition that does not contain them. The flexibility is measured by % elongation, which is measured by stretching an 8 mm×4 mm×0.04 mm film at a rate of 0.0074 $s^{-1}$. These measurements are performed at room temperature on a Rheometric Scientific DMTA V. This method is described in Loren Hill—Progress in Organic Coatings, Volume 24, 1994, page 147 and Mark Nichols—Polymer Degredation and Stabilization—Volume 60, 1998, page 291.

While the at least one thermally curable binder component (a2) must have at least two isocyanate-reactive groups, more than two isocyanate groups are within the scope of the invention. In a particularly preferred embodiment, the thermally curable binder component (a2) will have from two to ten isocyanate-reactive groups (a21) per molecule, most preferably from two to seven isocyanate-reactive groups (a21) per molecule.

The thermally curable binder component (a2) is oligomeric or polymeric as defined above. Number average molecular weights of from 500 to 50,000 are suitable, with number average molecular weights of from 500 to 4000 preferred and those from 500 to 2000 being most preferred.

Oligomers and polymers generally suitable for use as thermally curable binder component (a2) may be (meth) acrylate copolymers, polyesters, alkyds, amino resins, polyurethanes, polylactones, polyester polyols, polycarbonates, polyethers, epoxy resin-amine adducts, (meth)acrylatediols, partially saponified polyvinyl esters of polyureas, and mixtures thereof. Particularly preferred oligomers and polymeric materials suitable for use as component (a2) are (meth)acrylate copolymers, polyesters, polyurethanes, and epoxy resin-amine adducts.

Polyesters having active hydrogen groups such as hydroxyl groups are especially suitable for use as thermally curable binder component (a2). Such polyesters may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Suitable polyesters can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, sebacic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare the polyester include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include 2,2-dimethyl-3-hydroxypropyl-2,2-dimethyl-3-hydroxypropionate. Other suitable glycols include hydrogenated Bisphenol A, cyclohexanediol, cyclohexanedimethanol, caprolactone-based diols such as the reaction product of ε-caprolactone and ethylene glycol, hydroxy-alkylated bisphenols, polyether glycols such as poly(oxytetramethylene)glycol, and the like. Although the polyol component can comprise all diols, polyols of higher functionality can also be used. Examples of polyols of higher functionality would include trimethylol ethane, trimethylol propane, pentaerythritol, and the like.

Some thermally curable binders (a2) that may be suitable for use in the instant invention are commercially available under the trade names DESMOPHEN® 650, 2089, 1100, 670, 1200, or 2017 from Bayer, PRIPLAS® or PRIPOL® resins from Uniquema, Chempol®, polyester or polyacrylate-polyol from CCP, or CRODAPOL® resins from Cray Valley.

However, it has been found that a particularly advantageous balance of performance properties can be achieved when thermally curable binder component (a2) has substantially no functional groups having bonds activatable upon exposure to UV radiation. Such functional groups may be those as described above with regards to functional groups (a11). Most preferably, thermally curable binder component (a2) will be a fully saturated compound.

Optionally, thermally curable component (a2) may also be selected to have a polydispersity (PDI) of less than 4.0, preferably less than 3.5, more preferably a polydispersity of from 1.5 to less than 3.5 and most preferably a polydispersity of from 1.5 to less than 3.0. Polydispersity is determined from the following equation: (weight average molecular weight ($M_w$)/number average molecular weight ($M_n$)). A monodisperse polymer has a PDI of 1.0. Further, as used herein, $M_n$ and $M_w$ are determined from gel permeation chromatography using polystyrene standards.

In another optional aspect of the invention, the thermally curable binder component (a2) may also be selected so as to have less than 5% by weight of aromatic ring moieties, preferably no more than 2% by weight of aromatic ring moieties, and most preferably from 0 to less than 2% by weight of aromatic ring moieties, all based on the nonvolatile weight of thermally curable binder component (a2).

An especially preferred polyester for use as thermally curable binder component (a2) is SETAL™ 26-1615, commercially available from Akzo Nobel of Louisville, Ky.

The amount of component (a2) in the coating compositions of the invention may vary widely and is guided by the requirements of the individual case. However, thermally curable binder component (a2) is preferably used in an amount of from 5 to 90% by weight, more preferably from 6 to 80% by weight, with particular preference from 7 to 70% by weight, with very particular preference from 8 to 60% by weight, and in particular from 9 to 50% by weight, based in each case on the total nonvolatile solids of the film-forming components of the coating composition.

The dual cure coating compositions of the invention also comprise at least one thermally curable crosslinking component (a3). Most preferably, thermally curable crosslinking component (a3) will be a di- and/or polyisocyanate, with polyisocyanates being most preferred. Such di- and/or polyisocyanates may be blocked or unblocked.

The thermally curable crosslinking component (a3) will preferably contain on average at least 2.0 preferably more than 2.0, and in particular more than 3.0 isocyanate groups per molecule. There is basically no upper limit on the number of isocyanate groups; in accordance with the invention, however, it is of advantage if the number does not exceed 15, preferably 12, with particular preference 10, with very particular preference 8.0, and in particular 6.0. Most preferably, thermally curable crosslinking component (a3) will have from 2.5 to 3.5 isocyanate groups per molecule.

Examples of suitable diisocyanates are isophorone diisocyanate (i.e., 5-isocyanato-i-isocyanatomethyl-1,3,3-trimethylcyclohexane), 5-isocyanato-1-(2-iso-cyanatoeth-1-yl)-1,3,3-trimethylcyclohexane, 5-iso-cyanato-1-(3-isocyanatoprop-1-yl)-1,3,3-trimethylcyclo-hexane, 5-isocyanato-(4-isocyanatobut-1-yl)-1,3,3-tri-methylcyclohexane, 1-isocyanato-2-(3-isocyanatoprop-1-yl)cyclohexane, 1-isocyanato-2-(3-isocyanatoeth-1-yl) cyclohexane, 1-isocyanato-2-(4-isocyanatobut-1-yl) cyclohexane, 1,2-diisocyanatocyclobutane, 1,3-di-isocyanatocyclobutane, 1,2-diisocyanatocyclopentane, 1,3-diisocyanatocyclopentane, 1,2-diisocyanatocyclo-hexane, 1,3-diisocyanatocyclohexane, 1,4-diisocyanato-cyclohexane, dicyclohexylmethane-2,4-diisocyanate, trimethylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate, methylpentyl diisocyanate (MPDI), nonane triisocyanate (NTI) or diisocyanates derived from dimer fatty acids, as sold under the commercial designation DDI 1410 by Henkel and described in the patent publications WO 97/49745 and WO 97/49747, especially 2-heptyl-3,4-bis(9-isocyanatononyl)-1-pentyl-cyclohexane, or 1,2-, 1,4-, or 1,3-bis(isocyanato-methyl)cyclohexane, 1,2-, 1,4-, or 1,3-bis(2-isocyanatoeth-1-yl)cyclohexane, 1,3-bis(3-isocyanatoprop-1-yl)cyclohexane, 1,2-, 1,4-, or 1,3-bis (4-isocyanatobut-1-yl)cyclohexane or liquid bis(4-isocyanatocyclohexyl)methane with a trans/trans content of up to 30% by weight, preferably 25% by weight, and in particular 20% by weight, as described in the patent applications DE 44 14 032 A1, GB 1220717 A1, DE 16 18 795 A1, and DE 17 93 785 A1, preferably isophorone diisocyanate, 5-isocyanato-1-(2-isocyanatoeth-1-yl)-1,3,3-trimethylcyclohexane, 5-isocyanato-1-(3-iso-cyanatoprop-1-yl)-1,3,3-trimethylcyclohexane, 5-iso-cyanato-(4-isocyanatobut-1-yl)-1,3,3-trimethylcyclo-hexane, 1-isocyanato-2-(3-isocyanatoprop-1-yl)pypio-hexane, 1-isocyanato-2-(3-isocyanatoeth-1-yl)cyclo-hexane, 1-isocyanato-2-(4-isocyanatobut-1-yl)cyclo-hexane, or HDI, with HDI being especially preferred.

Examples of suitable polyisocyanates are isocyanato-containing polyurethane prepolymers that can be prepared by reacting polyols with an excess of diisocyanates and which are preferably of low viscosity.

It is, also possible to use polyisocyanates containing isocyanurate, biuret, allophanate, iminooxadiazindione, urethane, urea, carbodiimide and/or uretdione groups, prepared conventionally from the above-described diisocyanates. Examples of suitable preparation processes and polyisocyanates are known, for example, from the patents CA 2,163,591 A, U.S. Pat. No. 4,419,513, U.S. Pat. No. 4,454,317 A, EP 0 646 608 A, U.S. Pat. No. 4,801,675 A, EP 0 183 976 A1, DE 40 15 155 A1, EP0 303 150 A1, EP0 496 208 A1, EP0 524 500 A1, EP0 566 037 A1, U.S. Pat. No. 5,258,482 A1, U.S. Pat. No. 5,290,902 A1, EP 0 649 806 A1, DE 42 29 183 A1, and EP 0 531 820 A1, or are described in the German patent application DE 100 05 228.2. The isocyanurate of HDI is especially preferred for use as thermally curable crosslinking component (a3).

The high-viscosity polyisocyanates described in the German patent application DE 198 28 935 A1, or the polyisocyanate particles surface-deactivated by urea formation and/or blocking, as per the European patent applications EP 0 922 720 A1, EP 1 013 690 A1, and EP 1 029 879 A1 are also suitable for use as thermally curable crosslinking component (a3).

Additionally suitable are the adducts, described in the German patent application DE 196 09 617 A1, of polyisocyanates with dioxanes, dioxolanes and oxazolidines containing isocyanate-reactive functional groups and still containing free isocyanate groups.

Aminoplast resins are also suitable for use as thermally curable crosslinking component (a3). Examples of suitable aminoplast resins include melamine formaldehyde resin (including monomeric or polymeric melamine resin and partially or fully alkylated melamine resin including high imino melamines), urea resins (e.g., methylol ureas such as urea formaldehyde resin, alkoxy ureas such as butylated urea formaldehyde resin) and the like. Also useful are aminoplast resins where one or more of the amino nitrogens is substituted with a carbamate group for use in a process with a curing temperature below 150° C., as described in U.S. Pat. No. 5,300,328.

Examples of suitable tris(alkoxycarbonylamino)triazines are described in U.S. Pat. Nos. 4,939,213 and 5,084,541, and Eur. Pat. 0 624 577. Preferred are tris(methoxy-, tris (butoxy-, and/or tris(2-ethylhexoxycarbonylamino)triazine.

Most preferably, however, thermally curable crosslinking component (a3) will be a polyisisocyanate such as the isocyanurate of HDI. In a particularly preferred embodiment, thermally curable crosslinking component (a3) will be substantially free of functional groups having bonds activatable upon exposure to actinic radiation, especially UV radiation. Such bonds are described above in regards to functional groups (a11). Most preferably, thermally curable crosslinking component (a3) will be a polyisocyanurate of HDI that is substantially free of carbon-carbon double bonds.

The amount of thermally curable crosslinking component (a3) in the coating compositions of the invention will generally be from 5 to 70% by weight, more preferably from 10 to 60% by weight, with particular preference from 15 to 55% by weight, with very particular preference from 20 to 50% by weight, and in particular from 25 to 45% by weight, based in each case on the total nonvolatile of the film-forming components of the coating compositions of the invention.

In a most preferred aspect of the invention, the ratio of NCO groups (a31) to the sum of isocyanate-reactive functional groups in components (a12) and (a21) is less than 1.30, preferably from 0.50 to 1.25, more preferably from 0.75 to 1.10, very preferably less than 1.00, and most preferably from 0.75 to 1.00. In particular, a desirable balance between porosity sealing and adhesion, especially adhesion measured with respect to cold gravel, thermal shock, and weatherability, is obtained when the ratio of NCO groups (a31) to the sum of isocyanate-reactive functional groups in components (a12) and (a21) is less than 1.30, preferably from 0.50 to 1.25, more preferably from 0.75 to 1.10, very preferably less than 1.00, and most preferably from 0.75 to 1.00 and thermally curable binder component (a2) is substantially free of functional groups having bonds activatable upon exposure to UV radiation.

The coating compositions of the invention may further optionally comprise a reactive diluent (a4) curable with actinic radiation and/or thermally. If used, reactive diluents (a4) will preferably be curable with actinic radiation and most preferably with UV radiation. Most preferably, such reactive diluents will also further comprise one or more functional groups reactive with thermally curable crosslinking component (a3). In a most preferred embodiment, a reactive diluent (a4) will be curable with actinic radiation such as UV radiation and will further comprise a plurality of functional groups reactive with isocyanate groups such as are described above with regards to functional groups (a12) and (a21).

Examples of suitable thermally curable reactive diluents are positionally isomeric diethyloctanediols or hydroxyl-containing hyperbranched compounds or dendrimers, as described in the patent applications DE 198 09 643 A1, DE 198 40 605 A1, and DE 198 05 421 A1.

Further examples of suitable reactive diluents are polycarbonatediols, polyesterpolyols, poly(meth)-acrylatediols or hydroxyl-containing polyadducts.

Examples of suitable reactive solvents that may be used as reactive diluents include, but are not limited to, butyl glycol, 2-methoxypropaol, n-butanol, methoxybutanol, n-propanol, ethylene glycol monomethyl ether, ethylene glycol monobutyl ether, ethylene glycol monobutyl ether, diethylene glycol monomethyl ether, diethylene glycol □ropanedio ether, diethylene glycol diethyl ether, diethylene glycol monobutyl ether, trimethylolpropane, ethyl 2-hydroxylpropionate or 3-methyl-3-methoxybutanol and also derivatives based on propylene glycol, e.g., ethoxyethyl propionate, isopropoxypropanol or methoxypropyl acetate.

As most preferred reactive diluents (a4) that may be crosslinked with actinic radiation, use is made, for example, of (meth)acrylic acids and esters thereof, maleic acid and its esters, including monoesters, vinyl acetate, vinyl ethers, vinylureas, and the like. Examples that may be mentioned include alkylene glycol di(meth)acrylate, polyethylene glycol di(meth)acrylate, 1,3-butanediol di(meth)acrylate, vinyl (meth)acrylate, allyl (meth)-acrylate, glycerol tri(meth) acrylate, trimethylol-propane tri(meth)acrylate, trimethylolpropane di(meth)-acrylate, styrene, vinyl toluene, divinylbenzene, pentaerythritol, tri(meth)acrylate, pentaerythritol tetra(meth)acrylate, dipentaerythritol penta (meth)acrylate, propylene glycol di(meth)acrylate, hexanediol di(meth)acrylate, ethoxyethoxyethyl acrylate, N-vinylpyrrolidone, phenoxyethyl acrylate, dimethylaminoethyl acrylate, hydroxyethyl (meth)acrylate, butoxyethyl acrylate, isobornyl (meth)acrylate, dimethylacrylamide, dicyclopentyl acrylate, the long-chain linear diacrylates described in EP 0 250 631 A1 with a molecular weight of from 400 to 4000, preferably from 600 to 2500. For example, the two acrylate groups may be separated by a polyoxybutylene structure. It is also possible to use 1,12-dodecyl propanediol and the reaction product of 2 moles of acrylic acid with one mole of a dimer fatty alcohol having generally 36 carbon atoms. Mixtures of the aforementioned monomers are also suitable.

Further examples of suitable reactive diluents curable with actinic radiation are those described in Römpp Lexikon Lacke und Druckfarben, Georg Thieme Verlag, Stuttgart, New York, 1998, on page 491 under the entry on "Reactive diluents".

The coating compositions of the invention may further optionally comprise one or more pigments and/or fillers. The filler and/or pigment may comprise one or more color and/or effect pigments, fluorescent pigments, electrically conductive pigments, magnetically shielding pigments, metal powders, scratchproofing pigments, organic dyes, organic fillers, inorganic fillers, transparent fillers opaque fillers, and/or nanoparticles.

Where the coating composition is used to produce electrically conductive coating compositions, it will preferably comprise at least one electrically conductive pigment and/or at least one electrically conductive filler.

Examples of suitable effect pigments are metal flake pigments such as commercially customary aluminum bronzes, aluminum bronzes chromated in accordance with DE 36 183 A1, and commercially customary stainless steel bronzes, and also nonmetallic effect pigments, such as pearlescent pigments and interference pigments, for example, platelet-shaped effect pigments based on iron oxide with a color from pink to brownish red, or liquid-crystalline effect pigments. For further details, attention is drawn to Römpp Lexikon Lacke und Druckfarben, Georg Thieme Verlag, 1998, page 176, "Effect pigments" and pages 380 and 381, "Metal oxide-mica pigments" to "Metal pigments", and to the patent applications and parents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 832 A1, EP 0 293 746 A1, EP 0 417 567 A1, U.S. Pat. No. 4,828,826 A, and U.S. Pat. No. 5,244,649 A.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green, or ultramarine green, cobalt blue, ultramarine blue, or manganese blue, ultramarine violet or cobalt violet, and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, diazo pigments, anthraquinone pigments, benzimidazole pigments, quinacridone pigments, quinophthalone pigments, diketopyrrolovyrrole pigments, dioxazine pigments, indanthrone pigments, isoindoline pigments, isoindoli-none pigments, azomethine pigments, indigo pigments, metal complex pigments, perinone pigments, perylene pigments, phthalocyanine pigments, or aniline black.

For further details, attention is drawn to Römpp-Lexikon Lacke und DruckLParben, Georg Thieme Verlag, 1998, pages 180 and 181, "Iron blue pigments" to "Black iron oxide", pages 451 to 453, "Pigments" to "Pigment volume concentration", page 563, "Thioindigo pigments", page 567, "Titanium dioxide pigments", pages 400 and 467, "Naturally occurring pigments", page 459, "Polycyclic pigments", page 52, "Azomethine pigments", "Azo pigments", and page 379, "Metal complex pigments".

Examples of fluorescent pigments (daylight fluorescent pigments) are bis(azomethine) pigments.

Examples of suitable electrically conductive pigments are titanium dioxide/tin oxide pigments and mica pigments. A most preferred electrically conductive pigment is MINATEC® 40CM from EM Industries. Examples of magnetically shielding pigments are pigments based on iron oxides or chromium dioxide. Examples of suitable metal powders are powders—of metals and metal alloys such as aluminum, zinc, copper, bronze or brass.

Suitable soluble organic dyes are lightfast organic dyes with little or no tendency to migrate from the coating material or from the coatings produced from it. The migration tendency can be estimated by the skilled worker on the basis of his or her general knowledge in the art and/or determined by means of simple preliminary range finding tests, as part of tinting experiments, for example.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details, attention is drawn to Römpp Lexikon Lacke und Druckfarben, Georg Thieme Verlag, 1998, pages 250 ff., "Fillers"

It is of particular advantage with regard to viscosity and rheology to use mixtures of platelet-shaped inorganic fillers such as talc or mica and non-platelet-shaped inorganic fillers such as talc, dolomite, calcium sulfates or barium sulfate.

Examples of suitable transparent fillers are those based on silica, alumina or zirconium oxide, especially nanoparticles.

The amount of the above-described pigments and/or fillers in the coating compositions of the invention is generally from 0 to 50% by weight, based on the total nonvolatile of the coating composition, preferably from 5 to 50% by weight, more preferably from 5 to 45% by weight, with particular preference from 5 to 40% by weight, with very particular preference from 5 to 35% by weight, and most preferably from 5 to 30% by weight, all based on the total nonvolatile of the coating composition.

The dual cure coating compositions of the invention may further comprise one or more tackifiers. The term tackifier refers to polymeric adhesives additives that increase the tack, i.e., the inherent stickiness or self-adhesion, of the adhesives so that after a short period of gentle pressure they adhere firmly to surfaces (cf. Ullmann's Encyclopedia of Industrial Chemistry, CD-ROM, Wiley VCH, Weinheim, 1997, "Tackifiers")

Examples of suitable tackifiers are high-flexibility resins selected from the group consisting of homopolymers of alkyl (meth) acrylates, especially alkyl acrylates, such as poly(isobutyl acrylate) or poly(2-ethylhexyl acrylate), which are sold under the brand name ACRONAL® by BASF Aktiengesellschaft, ELVACITE® by Dupont, NEOCRYL® by Avecia, and PLEXIGUM® by Röhm; linear polyesters, as commonly used for coil coating and sold, for example, under the brand name DYNAPOL® by Dynamit Nobel, SKYBOND® by SK Chemicals, Japan, or under the commercial designation LTW by Hüls; linear difunctional oligomers, curable with actinic radiation, with a number average molecular weight of more than 2000, in particular from 3000 to 4000, based on polycarbonatediol or polyesterdiol, which are sold under the designation CN 970 by Craynor or the brand name EBECRYL® by UCB; linear vinyl ether homopolymers and copolymers based on ethyl, propyl, isobutyl, butyl and/or 2-ethylhexyl vinyl ether, sold under the brand name LUTONAL® by BASF Aktiengesellschaft; and nonreactive urethane urea oligomers, which are prepared from bis (4,4-isocyanatophenyl) methane, N,N-dimethylethanolamine and diols such as □ropanediols, hexanediol or dimethylpentanediol and are sold, for example, by Swift Reichold under the brand name SWIFT RANGE® or by Mictchem Chemicals under the brand name SURKOPACK® or SURKOFILM®.

The tackifiers may be used in an amount of from 0 to 10% by weight, more preferably from 0.1 to 9% by weight, with particular preference from 0.3 to 8% by weight, and most preferably from 0.4 to 5% by weight, based in each case on the solids of the dual cure coating composition of the invention.

The coating compositions of the invention may also have one or more photoinitiators and most preferably will have at least one photoiniatior. If the coating composition is to be crosslinked with UV radiation, it is generally preferable to use a photoinitiator. When used, the photoinitiator will be present in the coating material preferably in fractions of from 0.1 to 10% by weight, more preferably from 0.2 to 8% by weight, with particular preference from 0.3 to 7% by weight, and most preferably from 0.5 to 5% by weight, based in each case on the solids of the coating composition.

Examples of suitable photoinitiators are those of the Norrish II type, whose mechanism of action is based on an intramolecular variant of the hydrogen abstraction reactions as occur diversely in the case of photochemical reactions (by way of example, reference may be made here to Römpp Chemie Lexikon, 9$^{th}$, expanded and revised edition, Georg Thieme Verlag, Stuttgart, Vol. 4, 1991) or cationic photoinitiators (by way of example, reference may be made here to Römpp Lexikon Lacke und Druckfarben, Georg Thieme Verlag, Stuttgart, 1998, pages 444 to 446), especially benzophenones, benzoins or benzoin ethers, or phosphine oxides. It is also possible to use, for example, the products available commercially under the names IRGACURE® 184, IRGACURE® 819, IRGACURE® 1800, and IRGACURE® 500 from Ciba Geigy, GENOCURE® MBF from Rahn, and LUCIRIN® TPO and LUCIRIN® TPO-L from BASF AG. Besides the photoinitiators, customary sensitizers such as anthracene may be used in effective amounts.

The dual cure coating compositions of the invention may also optionally comprise at least one thermal crosslinking initiator. At from 80 to 120° C., these initiators form radicals that start the crosslinking reaction. Examples of thermolabile free-radical initiators are organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles or benzpinacol silyl ethers. C—C-cleaving initiators are particularly preferred. Such thermal initiators may be present in amounts of from 0 to 10% by weight, preferably from 0.1 to 8% by weight, and in particular from 1 to 5% by weight, based in each case on the solids of the coating material.

The coating material may further comprise water and/or at least one inert organic or inorganic solvent. Examples of inorganic solvents are liquid nitrogen and supercritical carbon dioxide. Examples of suitable organic solvents are the high-boiling ("long") solvents or low boiling solvents commonly used in coatings, such as ketones such as methyl ethyl ketone, methyl isoamyl ketone, or methyl isobutyl ketone, esters such as ethyl acetate, butyl acetate, ethyl ethoxypropionate, methoxypropyl acetate, or butyl glycol acetate, ethers such as dibutyl ether, or ethylene glycol, diethylene glycol, propylene glycol, dioropylene glycol, butylene glycol, or dibutylene glycol dimethyl, diethyl, or dibutyl ether, N-methylpyrrolidone, or xylenes or mixtures of aromatic and/or aliphatic hydrocarbons such as SOLVENTNAPHTHA®, petroleum spiril-135/180, dipentenes or SOLVESSO® (cf. also "Paints, Coatings and Solvents", Dieter Stoye and Werner Freitag (editors), Wiley-VCH, $2^{nd}$ edition, 1998, pages 327 to 349).

The coating composition of the invention may further optionally comprise one or more coating additives in effective amounts, i.e., in amounts of up to 40% by weight, with particular preference up to 30% by weight, and in particular up to 10% by weight, based in each case on the solids of the coating composition of the invention. Examples of suitable coatings additives are UV absorbers; light stabilizers such as HALS compounds, benzotriazoles, or oxalanilides; free-radical scavengers; crosslinking catalysts such as dibutyltin dilaurate, or lithium decanoate; slip additives; polymerization inhibitors; defoamers; emulsifiers, especially nonionic emulsifiers such as alkoxylated alkanols and polyols, phenols, and alkylphenols, or anionic emulsifiers such as alkali metal salts or ammonium salts of alkane carboxylic acids, alkanesulfonic acids, and sulfo acids of alkoxylated alkanols and polyols, phenols, and alkylphenols; wetting agents such as siloxanes, fluorine compounds, carboxylic monoesters, phosphoric esters, polyacrylic acids, and their copolymers, polyurethanes or acrylate copolymers, which are available commercially under the tradename MODAFLOW® or DISPARLON®; adhesion promoters such as tricyclodecane-dimethanol; leveling agents; film-forming auxiliaries such as cellulose derivatives; flame retardants; sag control agents such as ureas, modified ureas, and/or silicas, as described for example in the references DE 199 24 172 A1, DE 199 24 171 A1, EP 0 192 304 A1, DE 23 59 923 A1, DE 18 05 693 A1, WO 94/22968, DE 27 51 761 C1, WO 97/12945, and "Farbe+Lack", November 1992, pages 829 ff.; rheology control additives, such as those known from the patents WO 94/22968, EP 0 276 501 A1, EP 0 249 201 A1, and WO 97/12945; crosslinked polymeric microparticles, as disclosed for example in EP 0 038 127 A1; inorganic phyllosilicates such as aluminum magnesium silicates, sodium magnesium phyllosilicates, and sodium magnesium fluorine lithium phyllosilicates of the montmorillonite type; silicas such as AEROSILS™ silicas; or synthetic polymers containing ionic and/or associative groups such as polyvinyl alcohol, poly(meth)acryl-amide, poly(meth)acrylic acid, polyvinyl-pyrrolidone, styrene-maleic anhydride or ethylene-maleic anhydride copolymers and their derivatives, or hydrophobically modified ethoxylated urethanes or polyacrylates; flatting agents such as magnesium stearate; and/or precursors of organically modified ceramic materials such as hydrolyzable organometallic compounds, especially of silicon and aluminum. Further examples of suitable coatings additives are described in the textbook "Lackaddivite" [Additives for coatings] by Johan Bieleman, Wiley-VCH, Weinheim, New York, 1998.

It will be appreciated that the coating composition of the invention may be used in the processes of the invention in different forms. For instance, given an appropriate choice of above described components (a1), (a2), and (a3), and of the further constituents that may be present, the coating composition of the invention may be a liquid coating composition that is substantially free from organic solvents and/or water. Alternatively, the coating composition of the invention may comprise a solution or dispersion of the above-described constituents in water and/or organic solvents. It is a further advantage of the coating composition of the invention that solids contents of up to 80% by weight, based on the coating composition of the invention, may be formulated. Moreover, given an appropriate choice of its constituents as described above, the coating composition of the invention may be a powder coating composition, such as clearcoat. Additionally, such powder coating compositions may be dispersed in water to give powder slurry coating compositions.

The coating composition of the invention may be a one-component or two-component system as desired. If the coating composition of the invention is a one-component system, the thermally curable crosslinking component (a3) may in some cases need to be blocked to prevent premature crosslinking during storage. If the coating composition of the invention is a two-component system, the thermally curable crosslinking component will stored separately from the other components and will not be added to them until shortly before use.

The method of preparing the coating composition of the invention may generally be carried out using conventional mixing of the above-described components in appropriate mixing equipment, such as stirred tanks, dissolvers, Ultraturrax, inline dissolvers, toothed-wheel dispersers, pressure release homogenizers, microfluidizers, stirred mills or extruders. It will be appreciated that appropriate measures to minimize radiation activated crosslinking should be employed, i.e., the elimination of radiation sources.

The process of the invention can be used for the coating of microporous surfaces having pores with a size of from 10 to 1500, preferably from 20 to 1200, and in particular from 50 to 1000 mn. More preferably, the coating compositions of the invention may be used to seal microporous surfaces. Most preferably, the coating compositions of the invention may be used to substantially eliminate defects in one or more cured coating films.

The surfaces to be coated may or may not be electrically conductive or electrically insulating. Illustrative electrically conductive surfaces may be metallic or nonmetallic. Suitable nonmetallic conductive surfaces are, for example, electrically conductive ceramic materials, especially oxides and chalcogenides, or electrically conductive polymers.

In a particularly preferred embodiment of the processes of the invention, the substrate to be coated will be a microporous surface of a shaped article or component. Such articles or components may be made of materials such as wood, glass, leather, plastics, minerals, foams, fiber materials and fiber reinforced materials, metals, metalized materials, and mixtures thereof.

Illustrative foams are those foams per DIN 7726: 1982-05 that have open and/or closed cells distributed over their entire mass and which have a density lower than that of the framework substance. Preference is given to elastic and flexible foams per DIN 53580 (cf. also Römpp Lexikon Chemie, CD-ROM: Version 2.0, Georg Thieme Verlag, Stuttgart, New York, 1999, "Foams").

Metalized materials may be made of wood, glass, leather, plastics, minerals, foams, fiber materials, fiber reinforced materials, and mixtures thereof.

Suitable minerals include fired and unfired clay, ceramic, natural stone or artificial stone or cement. Illustrative fiber materials preferably comprise glass fibers, ceramic fibers, carbon fibers, textile fibers, polymer fibers or metal fibers, composites of these fibers, and mixtures thereof. Suitable fiber reinforced materials include plastics reinforced with the aforementioned fibers.

Suitable metals include reactive utility metals, especially iron, steel, zinc, aluminum, magnesium, titanium, and alloys of at least two of these metals.

Illustrative shaped components and articles are automotive components such as body panels, truck beds, protective plates, fenders, spoilers, hoods, doors or lamp reflectors; sanitary articles and household implements; components for buildings, both inside and outside such as doors, windows, and furniture; industrial components, including coils, containers, and radiators; and electrical components, including wound articles, such as coils of electric motors.

Preferred shaped components and articles will be made of SMC (sheet molded compound) or BMC (bulk molded compound). Thus, in one aspect of the process of the invention, the coating composition of the invention will be applied to one or more surfaces of shaped articles or components made of SMC or BMC.

The coating compositions of the invention may be applied one or more times to a particular substrate. In the such cases, the applied coatings of the invention may be the same or different. Most preferably, the coating compositions of the invention will be applied only once to a particular surface. That is, desirable sealing performance and the substantial elimination of surface defects may, and preferably will be, obtained with a single application of the coating composition of the invention.

The coating compositions of the invention will generally be applied so as to have a wet film thickness that after curing results in a dry film thickness of from 10 to 100, preferably 10 to 75, more preferably from 10 to 55, and most preferably from 10 to 35 μm.

Illustrative application methods suitable for applying the coating compositions of the invention include spraying, brushing, knife coating, flow coating, dipping, rolling, and the like. Spray application methods, such as compressed air spraying, airless spraying, high-speed rotation, electrostatic spray application (ESTA), alone or in conjunction with hot-spray application such as hot air spraying, for example, are preferred.

The coating compositions may be applied at temperatures of no more than 93° C. (200° F.), so that appropriate application viscosities are attained without any change or damage to the coating composition of the invention or its overspray (which may be intended for reprocessing) during the short period of thermal stress. Hot spraying, for instance, may be configured in such a way that the coating composition of the invention is heated only very briefly in the spray nozzle or shortly before the spray nozzle. More preferably the coating compositions of the invention will be applied at a temperature of from 21° C. to 57° C. (70 to 135° F.), and most preferably at 26.7° C. to 43° C. (80 to 110° F.).

The spray booth used for application may be operated, for example, with a circulation system, which may be temperature-controllable, and which is operated with an appropriate absorption medium for the overspray, an example of such medium being the coating composition of the invention of the invention itself.

Processing and application of the coating composition of the invention may be done under visible light with or without wavelengths in the electromagnetic spectrum capable of activating radiation curable component (a1). However, it will be appreciated that if application and/or processing occurs with illumination having wavelengths that could activate radiation curable component (a1) or optional reactive diluent (a4), all vessels or lines containing the coating composition of the invention will be covered so as to protect the coating from said illumination. In this way, pre-gelation of the coating composition of the invention can be avoided.

In accordance with the invention, applied coating compositions of the invention are then cured with actinic radiation, most preferably UV radiation, and thermally.

Curing may take place after a certain rest period. This period may have a duration of from 0 s to 2 h, preferably from 1 min to 1 h, and most preferably from greater than 5 min to less than 30 min. The rest period is used, for example, for leveling and devolatilization of the coat of the coating composition of the invention or for the evaporation of volatile constituents such as solvents, water or carbon dioxide, if the coating composition of the invention was applied using supercritical carbon dioxide as solvent. The drying that takes place in the rest period may be shortened and/or assisted by the application of elevated temperatures below 60° C. (140° F.), more preferably below 49° C. (120° F.), provided this does not entail any damage or alteration to the coat of the coating composition of the invention, such as premature thermal crosslinking, for instance.

Curing takes place preferably with actinic radiation such as UV radiation or electron beams. If desired, it may be supplemented by or conducted with actinic radiation from other radiation sources. Most preferably such first stage curing will done under an inert gas atmosphere, i.e., via the supply of carbon dioxide and/or nitrogen directly to the surface of the applied coating composition of the invention. In the case of UV cure, the inert gas prevents the formation of ozone.

Curing with actinic radiation may be done via customary and known radiation sources and optical auxiliary measures. Illustrative examples of suitable radiation sources are high or low pressure mercury vapor lamps, with or without lead, iron, or gallium doping in order to open up a radiation window of up to 450 nm, or electron beam sources. Metal halide emitters may also be used. Most preferred are sources of UV radiation. The arrangement of these sources is known in principle and may be adapted to the circumstances of the work piece and the process parameters. In the case of work pieces of complex shape, as are envisaged for automobile bodies, the regions not accessible to direct radiation (shadow regions) such as cavities, folds and other structure undercuts may be (partially) cured using pointwise, small-area or all-round emitters, in conjunction with an automatic movement means for the irradiation of cavities or edges. Radiation cure of the applied coating compositions of the invention may be effected by subjecting the applied coatings to actinic radiation in amounts of from 1.5 to 15.0 J/cm$^2$, preferably from 1.0 to 10.0 J/cm$^2$, and most preferably from 2.0 to 7.0 J/cm$^2$.

The coating compositions of the invention may be said to be radiation cured when at least 75% of the radiation curable groups from component (a1) and optional component (a4) are crosslinked, preferably at least 80%, more preferably at least 90% and most preferably at least 95%, based on the total number of radiation curable groups from radiation curable component (a1) and optional reactive diluent (a4). The % of crosslinking of radiation curable groups may be determined by RAMAN microscope since the peak corresponding to radiation curable groups such as C=C groups decreases with increasing crosslinking. A reference peak is chosen that does not change during the curing of the coating composition. It will be appreciated that the location of the reference peak is dependent upon the chemistry of the particular coating composition and may be selected by one of skill in the art.

The equipment and conditions for these curing methods are described, for example, in R. Holmes, UV and E.B. Curing Formulations for Printing Inks, Coatings and Paints, SITA Technology, Academic Press, London, United Kingdom 1984.

Curing may take place in stages, i.e., by multiple exposure to actinic radiation. This may also be done alternately, i.e., by curing in alternation with UV radiation and with electron beams.

The thermal curing takes place in accordance with the customary and known methods such as heating in a forced air oven or exposure to IR or NIR lamps. As with the curing with actinic radiation, thermal curing may also take place in stages. Advantageously, the thermal curing takes place at temperatures of from 49° C. to 177° C. (120° F. to 350° F.), preferably between 65.5° C. to 149° C. (150 to 300° F.), and more preferably between 93° C. to 149° C. (200 to 300° F.), and most preferably from 107° C. to 135° C. (225 to 275° F.). The coatings of the invention may be thermally cured for a period of from 1 min up to 2 h, preferably 2 min up to 1 h, and in particular from 5 to 30 min.

The radiation curing and thermal curing may be employed simultaneously or alternately. Where the two curing methods are used in alternation it is possible, for example, to commence with thermal curing and to end with actinic radiation. In other cases it may prove advantageous to commence with actinic radiation curing and to end with it as well.

In another aspect of the invention, a process of the invention may comprise the application of the coating composition of the invention, radiation cure of the applied coating composition, application of one or more other coating compositions to the radiation cured coating composition, and subsequent joint thermal curing of both the radiation cured coating composition of the invention and the applied one or more other coating compositions.

It is a very particular advantage of the process of the invention that the shaped components and SMCs and BMCs coated with the coating composition of the invention, following drying and exposure to actinic radiation, preferably in an incompletely cured state, may be immediately overcoated, which for the production of the shaped components of the invention and for the SMCs and BMCs of the invention signifies a significant time, energy and cost saving.

Furthermore, articles coated with the coating composition of the invention, after drying and exposure to actinic radiation, may be subjected to thermal aftercuring, at 90° C. for 20 minutes, for example, after which the coated articles of the invention may be stored in stacks to await further processing without fear of sticking or deformation.

It is an aspect of the invention that the coating compositions of the invention provide crosslinked films of exceptional integrity at relatively low temperatures, i.e., less than 71° C. (160° F.). In particular, UV cured films of the coating composition of the invention have crosslinked networks of an integrity sufficient to block porosity. As a result, topcoated articles and substrates obtained by the processes of the invention are substantially free of surface defects. Such defects are often referred to as porosity, microbubbles, blisters, popping, or pops. It has been found that porosity defects can, in some instances, be completely eliminated with the use of the coating compositions of the invention.

In addition, coated articles and substrates of the invention have outstanding thermal stability. It has been observed that even under thermal loads at high temperatures for several hours, the surface of the radiation and thermally cured coating is not damaged. As a result, articles and substrates previously coated with the coating composition of the invention may therefore be adhered directly to uncoated automobile body fixtures prior to the submersion of the automobile fixture into the electrodeposition bath. That is, submersion into an electrodeposition bath and curing oven have not been found to adversely affect the previously applied coating compositions of the invention.

The coatings and seals obtained by the procedure of the invention also possess outstanding sandability and polishability, thus facilitating the repair of defects.

Coating compositions of the invention may be overcoated with all customary and known, aqueous or conventional, liquid or solid, water-free and solvent-free, physically or thermally and/or actinic-curable primers, electrocoats, primer-surfacers or antistonechip primers, solid-color and/or effect topcoats or basecoats, and also clearcoats. The resultant multicoat systems exhibit outstanding intercoat adhesion.

SPECIFIC EMBODIMENTS OF THE INVENTION

The invention is further described in the following examples. The examples are merely illustrative and do not in any way limit the scope of the invention as described and claimed.

EXAMPLE 1

Coating composition samples 1–6 were prepared as follows with the amounts of material in grams shown in Table 1 below. Sample 1 was the comparative composition, and Samples 2–6 demonstrate the inclusion of a polyether or a polyester diol. The polyester resin and/or polytetrahydrofuran and/or poly ε-caprolactone, urethane methacrylate, tackifier resin, and leveling agent were mixed in a 1-quart can under mild cowles blade agitation for approximately 5 minutes until homogenous. The rheology additive was added and dispersed under medium cowles agitation for approximately 5 minutes. The conductive mica was slowly added under mild agitation over a period of about 5 minutes followed by a similar addition of talc. The catalyst was then added. The sample was sealed and held overnight. The sample was processed through cowles-like "High Speed Dispersion" and agitated at 7500 rpm for 20 minutes. The particle size was checked by draw down method and was found to be approximately 27 μm on the grind gage. A photoinitiator solution was then added. The photoinitiator solution was previously made and consisted of both photoinitiators and the butyl acetate. The finished, unreduced A component was filtered through two mesh cones to eliminate dirt and/or other particles and stored in a 1-quart steel can until spray application. Component B (an isocyanurate of HDI) and A were then mixed together prior to spray application.

TABLE 1

| | | Sample | | | | | |
|---|---|---|---|---|---|---|---|
| | | 1 | 2 | 3 | 4 | 5 | 6 |
| | | % Polyester Removed | | | | | |
| | | 0 | 18 | 30 | 18 | 44 | 100 |
| polyester resin | Setal ® 26-1615 from Akzo Resins | 32.10 | 29.53 | 24.54 | 26.31 | 17.87 | 0 |
| polytetrahydrofuran | pTHF(650) from BASF | 0.00 | 4.61 | 7.74 | 0 | 0 | 0 |
| poly ε-caprolactone | TONE ® 201 from DOW | 0 | 0 | 0 | 6.92 | 14.09 | 26.62 |
| urethane methacrylate | IRR 351 (Ebecryl ® 8210) from UCB | 14.90 | 16.12 | 16.61 | 16.38 | 16.69 | 18.0 |
| polyester tackifier | Adhesion Resin LTS from Creanova | 2.00 | 2.22 | 2.29 | 2.26 | 2.30 | 2.48 |
| leveling agent | Disparlon ® LHP90 from King Industries | 0.11 | 0.12 | 0.12 | 0.12 | 0.12 | 0.13 |
| rheology additive | Bentone ® SD2 from Rheox and Antitera ® U from BYK | 4.70 | 4.22 | 4.31 | 4.25 | 4.33 | 4.67 |
| talc | | 6.80 | 7.40 | 7.56 | 7.45 | 7.6 | 8.19 |
| conductive mica | EM Industries | 15.80 | 17.14 | 17.50 | 17.25 | 17.58 | 18.96 |
| mineral spirits | | 11.20 | 8.98 | 9.47 | 9.34 | 9.52 | 10.26 |
| catalyst | 865 2% Lithium Ten-Cem ™ from OMG | 0.20 | 0.21 | 0.22 | 0.22 | 0.22 | 0.24 |
| photoinitiator sol'n | 10% Irgacure ® 819 from Ciba/90% Lucirin ® TPO from BASF | 4.00 | 4.45 | 4.58 | 4.52 | 4.60 | 4.96 |
| butyl acetate | | 9.19 | 5.00 | 5.06 | 4.99 | 5.08 | 5.48 |
| isocyanurate of HDI | N3390 from Bayer | 16.46 | 17.21 | 18.71 | 19.68 | 21.71 | 23.42 |

EXAMPLE 2

The % elongation (according to the test described above) of the resulting film, the number of pre stress pops, and the number of post stress pops were tested. The results are shown in Table 2 below. As more of the polyester was replaced, the % elongation of the film increased.

TABLE 2

| Sample | % Replacement of Polyester | % Elongation of Film | Number of Pre Stress Pops | Number of Post Stress Pops |
|---|---|---|---|---|
| 1 | 0 | 2.2 | 0 | 65 |
| 2 | 18 | 4.4 | 0 | 21 |
| 3 | 30 | 20 | 0 | 9 |
| 4 | 18 | 3.1 | 0 | 3 |
| 5 | 44 | 19.1 | 0 | 1 |
| 6 | 100 | 47.1 | 0 | 0 |

It should be appreciated that the present invention is not limited to the specific bodiments described above, but includes variations, modifications and equivalent embodiments defined by the following claims.

What is claimed is:

1. A coating composition comprising
   (a1) a radiation curable component that polymerizes upon exposure to actinic radiation comprising
      (a11) at least two functional groups comprising at least one bond that is activatable upon exposure to actinic radiation,
      (a12) optionally, at least one isocyanate-reactive functional group, and
      (a13) optionally, at least one hydroxyl-reactive functional group;
   (a2) a thermally curable binder component that polymerizes upon exposure to heat comprising at least two functional groups (a21) that are reactive with functional groups of component (a3), wherein at least 5% up to 100% by weight based on a nonvolatile weight of component (a2) is a component (X) that is a polymer with at least two functional groups (a21), a glass transition temperature of less than 0° C., and an equivalent weight of greater than 225 grams per equivalent;
   (a3) a thermally curable crosslinking component comprising at least two functional groups that are reactive with the functional groups (a21); and
   (a4) optionally, at least one reactive diluent,
wherein the coating composition is curable upon exposure to both actinic radiation and thermal energy.

2. The coating composition of claim 1, wherein component (X) is at least one of a polyether diol, polyether polyol, a polyester diol, and a polyester polyol.

3. The coating composition of claim 2, wherein the polyether diol is at least one of polyethylene oxide, polypropylene oxide, and polytetrahydrofuran.

4. The coating composition of claim 2, wherein the polyester diol is a polylactone.

5. The coating composition of claim 2, wherein the polyester polyol is a ε-caprolactone extension of pentaerythritol.

6. The coating composition of claim 1, wherein component (X) has a glass transition temperature of the homopolymer of less than −20° C.

7. The coating composition of claim 1, wherein component (X) has a glass transition temperature of the homopolymer of less than −50° C.

8. The coating composition of claim 1, wherein component (X) has an equivalent weight of greater than 265 grams per equivalent.

9. The coating composition of claim 1, wherein component (X) is polytetrahydrofuran.

10. The coating composition of claim 1, wherein the actinic radiation is UV radiation.

11. The coating composition of claim 1, wherein the thermally curable binder component (a2) comprises at least two isocyanate reactive functional groups.

12. The coating composition of claim 1, wherein the at least two isocyanate reactive functional groups (a21) are hydroxyl groups.

13. The coating composition of claim 1, wherein the thermally curable crosslinking component (a3) comprises at least two isocyanate groups.

14. The coating composition of claim 1, wherein the at least one functional group (a12) is a hydroxyl group.

15. The coating composition of claim 1, wherein the at least two functional groups of component (a3) are isocyanate groups, and a ratio of isocyanate groups to a sum of functional groups (a12) and (a21) is less than 1.3.

16. The coating composition of claim 15, wherein the ratio is less than 1.0.

17. The coating composition of claim 15, wherein the ratio is from 0.5 to 1.25.

18. The coating composition of claim 15, wherein the ratio is from 0.75 to 1.0.

19. The coating composition of claim 1, wherein the thermally curable binder component (a2) comprises less than 5% by weight of aromatic ring moieties based on the nonvolatile weight of the thermally curable binder component (a2).

20. The coating composition of claim 1, wherein the hydroxyl-reactive functional group (a13) is at least one of an isocyanate, an aminoplast, an epoxy, a silane, a cyclic anhydride, and a cyclic lactone.

21. The coating composition of claim 1, wherein the hydroxyl-reactive functional group (a13) is an isocyanate.

22. The coating composition of claim 1, wherein the isocyanate-reactive functional group (a12) is at least one of a thiol group, a primary amino group, a secondary amino group, an imino group, and a hydroxyl group.

23. A method comprising applying the coating composition of claim 1 to a substrate to form a film.

24. The method of claim 23 further comprising subjecting the film to actinic radiation.

25. The method of claim 24, wherein the actinic radiation is UV radiation.

26. The method of claim 24 further comprising subjecting the film to heat to provide a coated substrate.

27. The method of claim 26 further comprising applying at least one additional coating.

28. The method of claim 23 further comprising subjecting the film to heat and then to actinic radiation to provide a coated substrate.

29. The method of claim 23, wherein the substrate comprises a plastic.

30. The method of claim 29, wherein the substrate is a fiber-reinforced plastic substrate.

31. The method of claim 29, wherein the substrate is sheet molded compounds or bulk molded compounds.

* * * * *